United States Patent [19]

Billmers et al.

[11] Patent Number: 5,513,032
[45] Date of Patent: Apr. 30, 1996

[54] ACTIVELY PUMPED FARADAY OPTICAL FILTER

[75] Inventors: Richard I. Billmers, Bensalem; Vincent M. Contarino, Warrington; David M. Allocca, Warminster; Martin F. Squicciarini, Lansdale; William J. Scharpf, Bensalem, all of Pa.

[73] Assignee: The United States of America as represented by the Secretary of the Navy, Washington, D.C.

[21] Appl. No.: 440,724

[22] Filed: May 3, 1995

[51] Int. Cl.$^6$ .................................................. G02F 1/03
[52] U.S. Cl. ...................... 359/244; 359/280; 359/614; 359/885
[58] Field of Search .................................. 359/237, 244, 359/280, 281, 283, 284, 601, 614, 885

[56] References Cited

U.S. PATENT DOCUMENTS

| | | | |
|---|---|---|---|
| 3,569,715 | 3/1971 | Horning | 350/150 |
| 4,033,670 | 7/1977 | Tanton et al. | 350/151 |
| 5,245,465 | 9/1993 | Tomita et al. | 359/246 |
| 5,272,560 | 12/1993 | Baney et al. | 359/249 |

OTHER PUBLICATIONS

B. Yin and T. M. Shay "Faraday Anomalous Dispersion Optical Filter for the Cs 445 nm Transition", *IEEE Photonics Technology letters*, vol. 4, No. 5, pp. 488–490, May 1992.

Pochi Yeh, "Dispersive magnetooptic filters", *Applied Optics*, vol. 21, No. 11, pp. 2069–2075, Jun. 1, 1982.

J. Menders, K. Choi, M. Rivers, E. Korevaar and C. S. Liu, "Laser Excited Faraday Filter Noise Measurements at 532 nm", copy of viewgraphs for *Laser s 90* Conference, San Diego, Dec. 10, 1990.

*Primary Examiner*—Mark Hellner
*Attorney, Agent, or Firm*—Susan E. Verona

[57] ABSTRACT

An actively pumped optical filter includes a vapor cell having a population of electrons with the plurality of energy levels which receives light and transmits light according to a pumping mechanism. A magnetic source is provided for applying a magnetic field to the vapor cell. A first pulsed dye laser applies a first beam of light to the vapor cell causing transitions of the electrons from a first energy level to a second energy level. A second pulsed dye laser is used for measuring the transmission through the vapor cell. A third laser applies a beam of light to the first laser and a beam of light to the second laser. The third laser may be an Nd:YAG laser. Polarizers are disposed before and after the vapor cell and a delay path is provided for delaying the second beam of light before the second beam of light is applied to the laser cell. The delay path is tuned by adjusting the length.

9 Claims, 4 Drawing Sheets

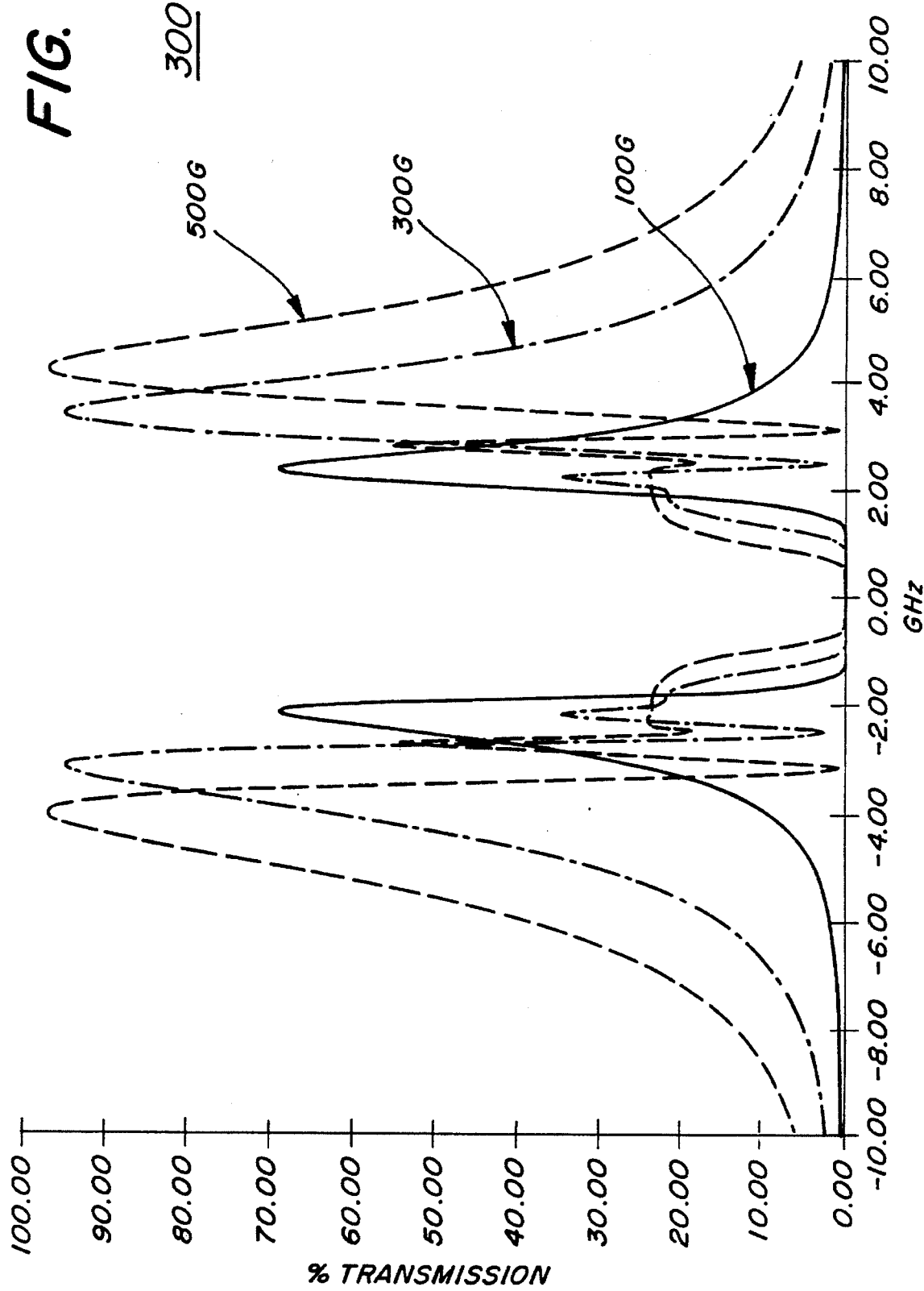

ACTIVELY PUMPED FARADAY OPTICAL FILTER

STATEMENT OF GOVERNMENT INTEREST

The invention described herein may be manufactured by or for the Government of the United States of America for Governmental purposes without the payment of any royalties thereon or therefor.

FIELD OF THE INVENTION

This invention relates to optical filters for use in laser communications systems, laser radar systems and other laser systems to transmit any specified light and reject other unwanted background radiation such as scattered sunlight in daytime applications.

BACKGROUND OF THE INVENTION

The object of optical filters, such as the optical filter of the present invention, is to filter light of a selected color, or frequency, and to do so with as narrow a bandwidth as possible. It is known in the prior art of optical filters to provide optical filters wherein layer shaving different characteristics are disposed on plates in order to shift colors. These optical filters are known as interference optical filters. However, interference filters are not very narrow and have very limited applications. They are limited by bandwidth and field of view.

It is also known in the prior art of optical filters to provide birefringent plates wherein the filter characteristics of the plates are dependent upon polarization sensitivity. Because birefringent optical filters use the interference effects of polarization they operate at more narrow specifications than interference filters. However, birefringent optical filters also bottom out and can not provide bandwidth below a known range because transmission drops below a useful level.

In order to obtain more narrow optical filtering than what is provided by interference filters and birefringent filters it is known to use atomic filters. Atomic filters use the characteristics of the atomic structure of selected elements to provide filtering and are therefore able to provide much more narrow specifications. These optical filters only work at certain predetermined wavelengths because there is no continuum in the atomic transition levels giving rise to the filter energy levels. Thus it is desirable to provide atomic filters which are capable of operating at other wavelengths, for example, at the specific wavelength of YAG.

One type of known atomic filter is the Faraday magnetic field rotatable polarization filter. In this type of optical filter a light is applied to the atoms of the filter and the polarization of the light is rotated. If polarization plates at 90° C. are used and rotation around the atomic energy levels is provided these optical filters can be extremely narrow.

The other type of atomic filter known in the art of optical filters is the absorption fluorescent atomic filter. When a photon of an incident light source strikes absorption fluorescent atomic filters it is absorbed by an atom in the filter causing an electron in the atom to rise from one energy level to a higher, or excited, energy level. When the excited electron falls from the higher energy level to an intermediate energy level the energy which is surrendered by the electron is emitted as light energy. The frequency of the -re-emitted light depends on the difference between the excited energy level and the intermediate energy level. A detector senses the re-emitted light. The detector must be able to sense light which is faint with respect to the background light.

It is known to provide two types of absorption filters of this nature, ground state absorption filters and excited state absorption filters. In the ground state absorption filters the electrons which are excited by the incident photons are at their lowest energy level at the time of excitation by the incident photon. In the excited state absorption filters the electrons are pushed to a higher energy level prior to the arrival of the incidentphoton. The process of pushing the electron to the higher energy level is known as pumping. Thus, when the photon imparts energy to the electron in excited state filters the electron rises from one excited state to another, higher, excited state. When the electron falls from the higher excited level to some lower energy level, energy is again emitted as light energy and the sensed by a detector. Thus, several types of optical filters have been developed previously for use in various laser communications and radar systems. Each of these prior art optical filters has its limitations.

Briefly the optical filter of the present invention is based upon the Faraday effect between two excited states in atomic potassium vapor. Zeeman splitting of the atomic energy levels occurs when an external magnetic field is applied to the atomic vapor to cause a differential absorption and dispersion of right-handed and left-handed circularly polarized light. This difference causes plane-polarized light near an absorption transition in the vapor material to be rotated $\pi/2$ radians with little attenuation. An atomic vapor cell is placed between two cross-polarizers which block all wavelengths of light except those which have been rotated $\pi/2$ radians. This is the basis for a Faraday rotation optical filter. The Faraday effect for transitions between excited states is caused to occur when the population is pumped into the first excited state from the ground state. In this process the population of electronsis optically excited from the $4S_{1/2}$ ground state into the $4P_{1/2}$ first excited state in potassium using 769.90 nm photons. This excitation requires approximately 10 $\mu$J/cm$^2$ of energy density to saturate the transition and to equalize the population in both the ground state and the first excited state. The excitation excited-state absorption from the $4P_{1/2}$ to the $8S_{1/2}$ levels causes the Faraday rotation at 532.33 nm. The filter is optically pumped with 770 nm light from a Nd:YAG pumped dye laser with a 100 ns pulsewidth and probed with a second dye laser scanned through the 532.33 nm transition.

The optical filter of the present invention offers several advantages over existing filter technology. The measured linewidth of the filter is 0.01 nm and the actual linewidth is believed to be less than 0.01 nm. This linewidth matches the linewidth of the laser used to interrogate the filter. The theoretical linewidth is approximately an order of magnitude less. Furthermore, the actively pumped Faraday optical filter of the present invention may be gated much more easily than other types of filters.

SUMMARY OF THE INVENTION

An actively pumped optical filter includes a vapor cell having a population of electrons with the plurality of energy levels which receives light and transmits light according to a pumping mechanism. A magnetic source is provided for applying a magnetic field to the vapor cell. A first pulsed dye laser applies a first beam of light to the vapor cell causing transitions of the electrons from a first energy level to a second energy level. A second pulsed dye laser is used for measuring the transmission through the vapor cell. A third laser applies a beam of light to the first laser and a beam of light to the second laser. The third laser may be an Nd:YAG laser. Polarizers are disposed before and after the vapor cell and a delay path is provided for delaying the second beam of light before the second beam of light is applied to the laser cell. The delay path is tuned by adjusting the length.

BRIEF DESCRIPTION OF THE DRAWINGS

FIG. 5 shows a graphical representation of the transmission spectrum for three differing applied magnetic fields at 220° C. for the actively pumped Faraday optical filter of the present invention.

DESCRIPTION OF THE PREFERRED EMBODIMENT

Figure 1:
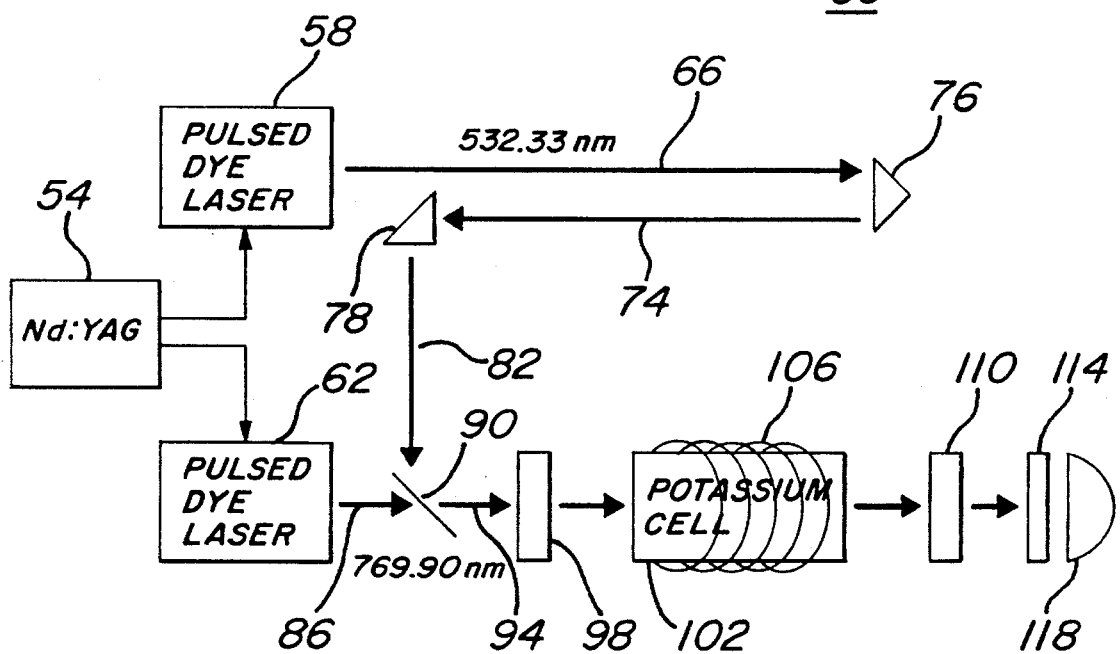
FIG. 1 shows a block diagram representation of the actively pumped Faraday optical filter of the present invention.

With reference to the attached drawings, there is disclosed the filter system and method of the present invention. The actively pumped Faraday filter 50 of the present invention as shown in particular in FIG. 1, is based upon the Faraday effect between two excited states in atomic potassium vapor. Zeeman splitting of the atomic energy levels occurs when an external magnetic field is applied to a potassium cell 102 using Helmholtz coils 102. This causes a differential absorption and dispersion of right-handed and left-handed circularly polarized light. This effect is based on the Zeeman splitting of both the initial and the final electronic states involved in the absorptive transition in an external field.

The differential absorption causes plane-polarized light near an absorption transition in the vapor material to be rotated π/2 radians with little attenuation. The potassium cell 102 is placed between two cross-polarizers 108, 110 which block all wavelengths of light except those which have been rotated π/2 radians. This aspect of the present invention is the basis for Faraday rotation optical filters. Transitions from the ground state to higher-energy excited states in Cs (455 nm) and Rb (780 nm) are known in the art. The Faraday effect also works for transitions between excited states if the population can be pumped into the first excited state from the ground state.

The right and left circularly polarized light beams travel through the atomic vapor at slightly different velocities. The effect of this difference on a linearly polarized beam of light, which may be considered to be a superposition of two equal-amplitude right and left circularly polarized beams, is the rotation of its plane of polarization. Because of this rotation the linearly polarized light is effectively blocked by the cross-polarizers 98, 110. A typical extinction ratio of $10^5$ or higher is partially transmitted in the absence of the axial magnetic field. The magnitude of rotation, and consequently the transmission, depend upon the number density of atoms in the vapor of the potassium vapor cell 102, the transition cross section, the interaction length and the strength of the axial field provided by Helmholtz coils 106.

Figure 2:
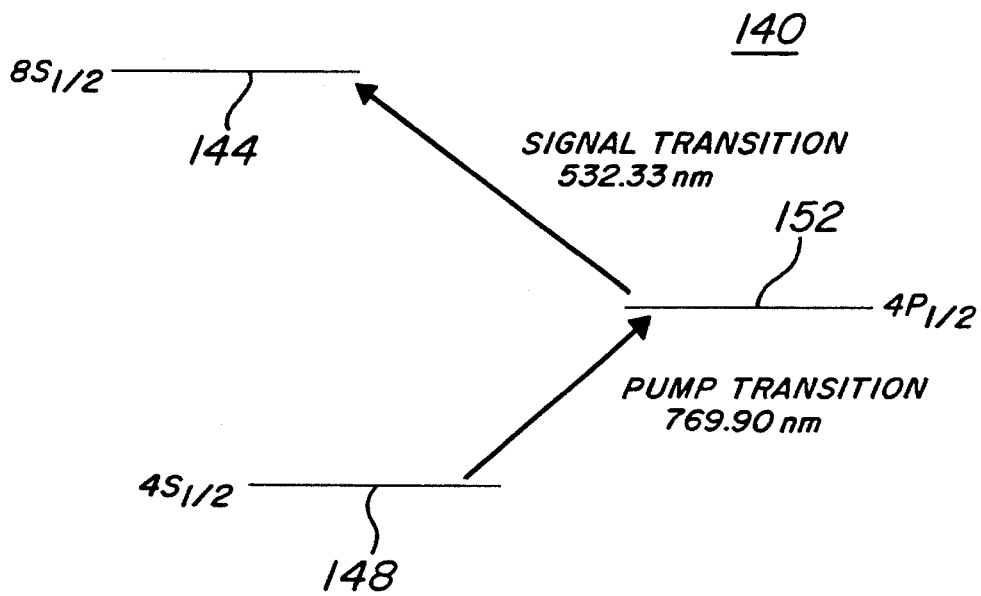
FIG. 2 shows a simplified energy level diagram for the actively pumped Faraday optical filter of FIG. 1 wherein the vapor cell of the optical filter is formed of potassium.

A simplified energy level diagram 140 illustrating the excitation process for potassium is shown in FIG. 2. The excitation process is twofold. First, the population is optically excited from the $4S_{1/2}$ ground state 148 into the $4P_{1/2}$ first excited state 152 in potassium using light of 769.90 nm photons. This process requires approximately 10 µJ/cm$^2$ of energy density to saturate the transition and equalize the population in both the ground state and first excited state. Second, the excited-state absorption from the $4P_{1/2}$ state 152 to the $8S_{1/2}$ state 144 causes the Faraday rotation at 532.33 nm. The potassium vapor within the optical filter 50 may be provided by heating a 7.5 cm potassium cell 102 to temperatures in the range of, for example, 200° C. to 230° C. while maintaining the sidearm temperature at 200° C. The number density in the vapor phase is controlled by the sidearm temperature and may be 1.5×10$^{14}$ atoms/cm$^3$ at 200° C. A current of 3A may be passed through the Helmholtz coil 106 to provide a dc magnetic filed of 100G.

The 769.9 nm pump pulse used to excite the potassium atoms in cell 102 may be obtained from a conventional dye laser 62 (Spectra-Physics PDC$^{-1}$) pumped by the second harmonic of a Nd:YAG laser 54 (Spectra-Physics DCR2). The laser may be operated with a solution of the organic dye LDS75 (Excitor Chemical) in methanol. The dyelaser 58 may operate with a solution of Coumaren 500 in methanol and may be pumped by the third harmonic of the same Nd:YAG laser 54 generating the 532.33 nm probe pulse. The outputs of both dye lasers 58, 62 may be linearly polarized with a bandwidth of approximately ten GHz. While laser 54, which pumps lasers 58, 62, is set forth as a Nd:YAG laser, it will be understood by those skilled at the art that the excitation process may be implemented by diode lasers, flash lamps, hollow cathode lamps, electric gas RF discharge devices, or any other mechanism for pumping a laser. Similarly laser 62 may be replaced with any of these substitutions. Laser 58 may be any device which provides a LIDAR signal.

When the second and third harmonics from a Nd:YAG laser 54 are used to pump two pulsed dye lasers 58,62, the dye laser 62 is tuned to the ground state absorption at 769.90 nm. The light 86 from the dye laser 62 causes the population of the excited state. The dye laser 58 is scanned through the 532.33 nm transition which demonstrates the filter action. The long optical path 66, 74, 82 of dye laser 58 is used as a time delay to ensure that both pump photons and probe photons arrive coincidently at the potassium cell 102. Only light which has been rotated by π/2 passes through the cross-polarizers 98, 110. A red blocking filter 114 ensures that no stray pump photons interfere with the detection of 532 nm photons by detector 118.

Figure 3:
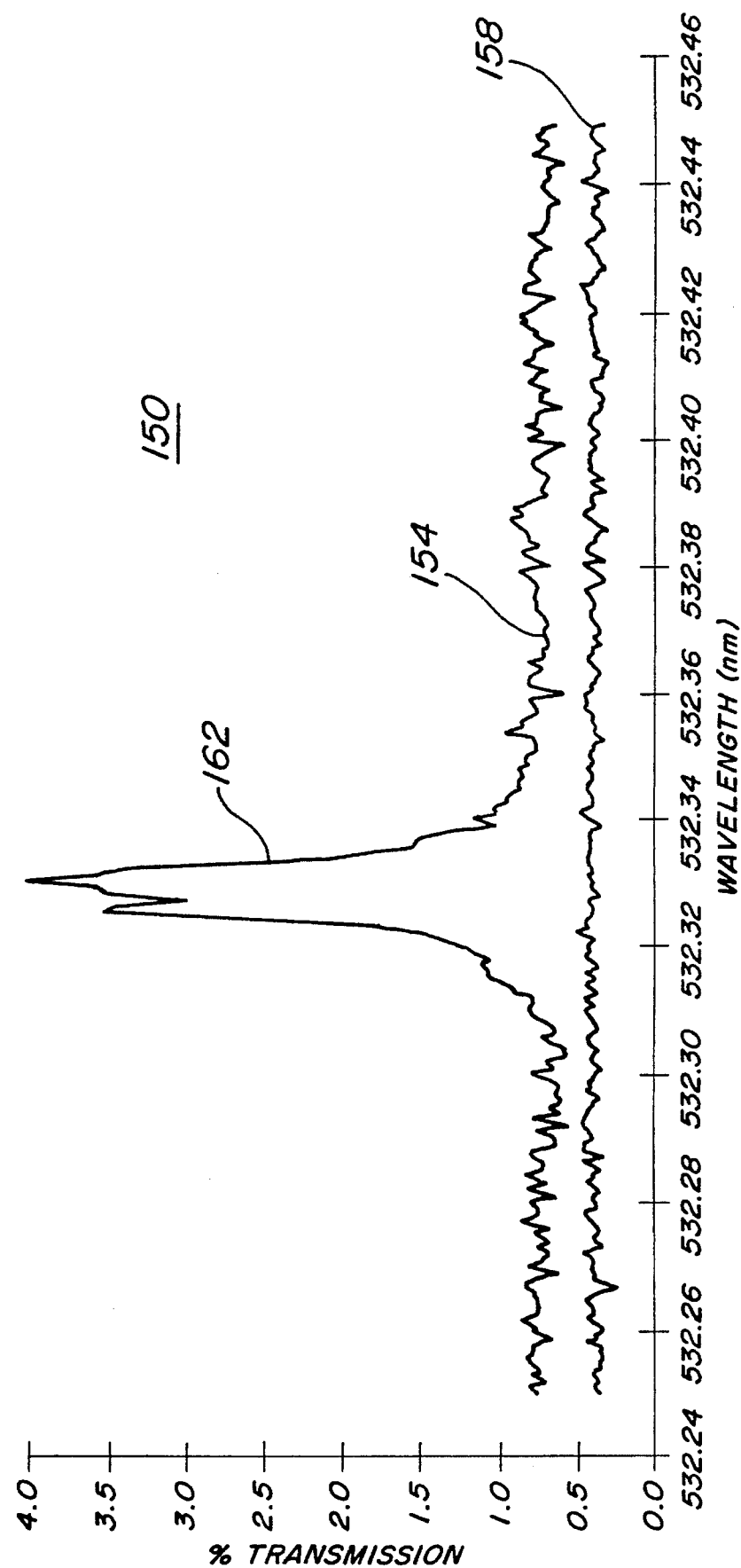
FIG. 3 shows a graphical representation of the optical spectrum of the actively pumped Faraday optical filter of the invention set forth in FIG. 1.
Figure 4:
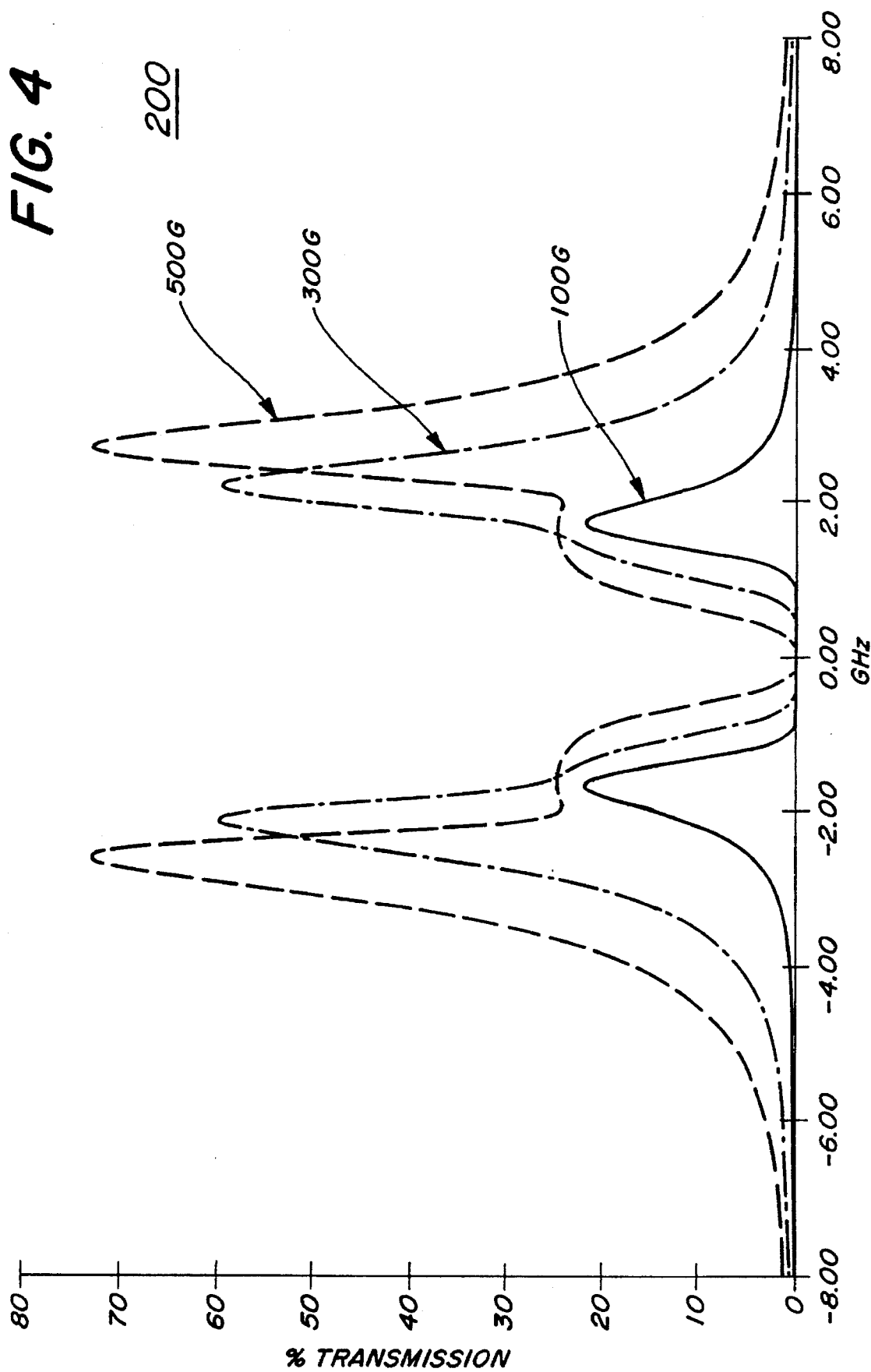
FIG. 4 shows a graphical representation of the transmission spectrum for three differing applied magnetic fields at 200° C. for the actively pumped Faraday optical filter of the present invention.

The filter spectrum graph 150 of FIG. 3 shows the spectrum of the actively pumped Faraday filter 50. Graphical representation 150 shows the percent transmission when the pump beam is blocked and graphical representation 154 of filter spectrum graph 150 shows the percent transmission when both the pump and the probe are applied. It will be seen that when the pump beam is applied there is a peak response 162 at 532 nm within graphical representation 154.

An important feature of the actively pumped Faraday filter 50 is that it has a linewidth less than 0.01 nm. This linewidth can be matched to the doubled Nd:YAG wavelength of 532 nm. Other ground state embodiments of the actively pumped Faraday filter 50 have been demonstrated with wavelengths in the near IR (780/820 nm) and in the blue (455 nm) regions of the visible spectrum. There are also CdS LYOT filters which match doubled Nd:YAG with linewidths of at least 0.1 nm or greater.

The actively pumped Faraday filter 50 offers several advantages over known filter technology. First, as previously described, the linewidth of the Faraday filter 50 is less than 0.01 nm. This is a narrow linewidth and a very useful result. Because the measured linewidth of the Faraday filter 50 is 0.01 nm it matches the linewidth of the laser used to interrogate the filter 50. The peak transmission of the actively pumped Faraday filter 50 is at least four percent. Additionally, the actively pumped Faraday filter 50 may be gated much more easily than other types of filters. The gating of prior art passive Faraday filters is achieved by rapidly switching the current applied to the electromagnets applied to the vapor cell 102. This is difficult to do in less than 10 ns due to inductive effects caused by the fast switching. The actively pumped Faraday filter 50 is instead switched by quickly switching the optical pump radiation. This is easily achieved using a Q-switched laser.

Furthermore, those skilled in the art will understand that the actively pumped Faraday filter 50 may utilize vapor phase elements other than potassium within vapor cell 102. For example, cesium, rubidium or thallium may be used within the vapor cell 102. The pump and receiver wavelengths are different for each of these alternate elements. The Faraday filter 50 of the present invention may be pumped with a continuous wave laser such as an argon ion pumped dye laser for CW type filter operation. The electromagnetic Helmholtz coil 106 may be replaced with a permanent magnet having approximately the same field strength in keeping with the spirit of the invention.

During one experimental operation of the optical filter 50 a pulse-repetition rate of 10 Hz for both dye lasers 58, 62 was determined by the rate of the pump laser 62. The resulting probe pulse was passed through a Glan-Thompson polarizer 98 and traversed the cell 102 collinearly with the pump pulse. The duration of the pump and the probe pulses was approximately 10 ns, longer than the spontaneous lifetime of 2.6 ns of the $4p^2 P_{1/2}$ state. See, for example, Wiese et al. in *Physics Vade Mecam*. H. L. Anderson, ed. American Institute of Physics, New York, 1981, p. 100. Both of the pulses were multimode. However, a measurement of their spatial profiles with a scanning razor blade revealed that they could be approximated as Gaussian. The beam diameters of the pump and the probe pulses were 1.1 and 0.65 mm, respectively. In an experimental operation of the optical filter 50 the energies of the pulses were controlled by a set of calibrated neutral-density filters. The energies of the pump and the probe pulses were maintained at 8 uJ and 0.6 pJ, respectively. The two tuning prisms 76, 78 in the path of the probe beam allowed the optical delay line within the optical filter 50 in order to ensure that the probe pulse arrived at the potassium cell 102 simultaneously with the pump pulse.

When the beams emerged from the potassium cell 102 they were blocked by the Glan-Thompson cross polarizer 110. The transmission of the probe pulse through the crossed polarizers 98, 110 when the cell 102 was not pumped was less than 0.001%. The detector 118 included a silicon photodiode (EG&G Model FND-100q) biased at 90 V and coupled with a low-noise linear amplifier (Analog Modules 113NPN) for detecting the transmitted light. The red blocking filter 114 before the detector 118 was a narrow bandpass filter ensuring that no pump radiation interfered with the detection of green light passing through the polarizer 110.

The signals from the photodiode of detector 118 were digitized, averaged over thirty laser shots and stored for display on a computer system. The computer system used with the optical filter 50 was also interfaced to stepper motors that scanned the dye lasers 58, 62 by angle tuning the gratings used as backmirrors of the dye laser cavities.

Results of experimental operations of the actively pumped Faraday filter 50 are shown as filter spectrum graph 400 in FIG. 6. The graphical representation 404 represents transmission spectrum of the excited-state Faraday filter 50. The pump beam with peak intensity of 84 Kw/cm$^2$ was tuned to 769.9 nm, the wavelength for the $4S_{1/2}$ to $8S_{1/2}$ transition. The magnetic field was activated and the polarizers 98, 110 crossed. The low intensity (16 mW, cm*) probe beam was then scanned through the $4P_{3/2}$ $8S½$ transition, and the output signal of detector 118 was plotted as a function of the probe wavelength. The intensity of the pump beam was 1.6 times smaller than the saturation intensity, whereas that of the probe beam was at least 3 orders of magnitude smaller. The saturation of the intensity of the pump beam was estimated by measuring the pump-intensity dependence of the probe absorption. The probe absorption varied linearly with the pump intensity for smaller intensities, then became sublinear, and ultimately saturated as the intensity was increased. The absorbance of the probe beam did not change even when its intensity was increased by 3– 4 orders of magnitude from the level used in the Faraday transmission measurement. This indicates that the probe-beam intensity was much lower than that necessary for saturating the excited-state transition.

The filter transmission reached its optimum value near 532.33 nm. The measured peak transmission of 3.5% was the ratio of the maximum photodetector signal to that measured with the pump beam blocked and the polarizers uncrossed. The graphical representation 412 shows that the Faraday transmission disappeared when the pump beam was turned off. The signal also disappeared when either of the two beams was tuned away from its respective resonance. The graphical representation 408 represents the spectrum of the actively pumped Faraday filter 50 with the pump and the probe beams on but no magnetic field applied. Similar behavior at high intensities for the 769.9 nm transition has been observed. The peak Faraday transmission and the zero-field transmission both depend on the intensity of the energy in the pump beam.

Several observations about the characteristics of this excited-state Faraday filter 50 may be made. First, the 3.5% peak transmission demonstrated should not be considered quantitative because the linewidth of the probe laser 58 was approximately one order of magnitude larger then the Doppler linewidth of the transition.

Additionally, the transmission spectrum of a ground-state FADOF is characterized by two well-separated peaks. The graphical representation 400 shows two barely resolved peaks 405, 406. Similar double-pumped filter spectra have been observed in many repeated scans. A model predicts a spectrum with two approximately 1 Ghz FWHM peaks separated by approximately 3.5 Ghz. However, with the approximately 10 Ghz linewidth laser used in this measurement resolution of that structure is not expected. However, the double-humped nature of the filter spectrum may be an indication that the spectrum consists of two unresolved peaks. Thus 10 Ghz may be considered to be an upper limit for the filter bandwidth.

A further issue concerns the noise expectations of the actively pumped Faraday filter 50. The operation of the excited-state ALF with the same two potassium transitions used was based on the detection of the fluorescence photons at 404.5 nm. However, the 769.8-nm pump photons alone generated photons at 404.5 nm in a two-step excitation process.

The operation of the excited state Faraday filter 50 is based on monitoring the transmission of the 532.33-nm probe photons through the crossed polarizers 98, 110. The 404.5-nm photons are not believed to contribute to the noise level in the excited-state Faraday filter 50. The results of a preliminary noise measurement showed no such measurable noise down to approximately 100 photons/pulse. This was the limit set by scattered light from the doubled YAG pump laser 54. It may be instructive to compare this number with $4.7 \times 10^4$ photons detected at the filter transmission peak under the experimental conditions set forth.

The graphical representations 200, 300 set forth the results of the model for the excited-state Faraday optical filter 50. Graphical representation 200 shows the dependence of the transmission on magnetic field at 200° C. and graphical representation 300 shows the same dependenceat 220° C. These predicted transmissions are larger than the 4% which was measured experimentally.

Many modifications and variations of the present invention are possible in view of the above disclosure. It is therefore to be understood, that within the scope of the appended claims, the invention may be practiced otherwise than as specifically described.

We claim:

1. An actively pumped optical filter for filtering incident light energy having a plurality of polarizations, comprising:

a vapor cell having a population of electrons with a plurality of energy levels for receiving said incident light energy and transmitting light energy from said vapor cell in accordance with said incident light energy and said energy levels;

first and second polarizers oriented at ninety degrees with respect to each other and disposed in the vicinity of said vapor cell wherein one of said first and second cross polarizers is disposed in the path of said incident light energy and the other is disposed in the path of said transmitted light energy;

a magnetic source for applying a magnetic field to said vapor cell;

an excitation source for applying an excitations to said vapor cell and causing transitions of said electrons from a first energy level to a second energy level of said plurality of energy levels;

said vapor cell being adapted to differentially transmit said differing polarizations of light energy when said excitation is applied and said elections are in said second energy level; and a detector for detecting said differential transmission.

2. The actively pumped optical filter of claim 1, wherein said excitation source comprises a laser for applying a beam of light energy.

3. The actively pumped optical filter of claim 2, wherein said laser is a Nd:YAG laser.

4. The actively pumped optical filter of claim 1, further comprising a delay path for delaying light energy before said of light energy is applied to said vapor cell.

5. The actively pumped optical filter of claim 4, further comprising a tuner for tuning said delay path.

6. The actively pumped optical filter of claim 5, wherein said tuner comprises means for adjusting the length of said delay path.

7. The actively pumped optical filter of claim 1, wherein said vapor cell comprises a potassium vapor cell.

8. The actively pumped optical filter of claim 1, wherein said magnetic source comprises a Helmholtz coil.

9. The actively pumped optical filter of claim 1, wherein said applied magnetic field is rotated.

\* \* \* \* \*